United States Patent
Becker et al.

(10) Patent No.: US 11,495,838 B2
(45) Date of Patent: Nov. 8, 2022

(54) METHOD FOR BALANCING STATES OF CHARGE OF AN ELECTRICAL ENERGY STORE

(71) Applicant: Robert Bosch GmbH, Stuttgart (DE)

(72) Inventors: Jens Becker, Benningen am Neckar (DE); Christoph Kroener, Rosstal (DE); Triantafyllos Zafiridis, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 17/027,260

(22) Filed: Sep. 21, 2020

(65) Prior Publication Data
US 2021/0091423 A1    Mar. 25, 2021

(30) Foreign Application Priority Data
Sep. 20, 2019 (DE) .......................... 102019214343.1

(51) Int. Cl.
*H01M 10/44* (2006.01)
*H02J 7/00* (2006.01)
*B60L 58/12* (2019.01)
*B60L 58/22* (2019.01)

(52) U.S. Cl.
CPC ........... *H01M 10/441* (2013.01); *B60L 58/12* (2019.02); *B60L 58/22* (2019.02); *H02J 7/007186* (2020.01); *H01M 2220/20* (2013.01); *H01M 2220/30* (2013.01)

(58) Field of Classification Search
CPC .......... H01M 10/441; H01M 2220/20; H01M 2220/30; H01M 10/4207; H01M 10/482; H01M 2010/4271; B60L 58/12; B60L 58/22; H02J 7/007186; H02J 2310/48; H02J 7/0014; Y02E 60/10; Y02T 10/70; G01R 31/3835; G01R 31/396
See application file for complete search history.

(56) References Cited

U.S. PATENT DOCUMENTS

| | | | |
|---|---|---|---|
| 11,284,805 B2* | 3/2022 | Hayase | A61B 5/7278 |
| 11,289,925 B2* | 3/2022 | Cho | H01M 10/482 |
| 2014/0167706 A1* | 6/2014 | Sun | H02J 7/00718 |
| | | | 320/160 |
| 2020/0346558 A1* | 11/2020 | Luo | B60L 58/22 |

FOREIGN PATENT DOCUMENTS

| | | |
|---|---|---|
| CN | 102231546 | 11/2011 |
| CN | 103020445 | 4/2013 |
| DE | 102010002326 A1 | 8/2011 |
| DE | 102010039913 A1 | 3/2012 |
| DE | 102013108198 A1 | 4/2014 |

* cited by examiner

Primary Examiner — Nha T Nguyen
(74) Attorney, Agent, or Firm — Michael Best & Friedrich LLP

(57) ABSTRACT
Method for balancing states of charge of an electrical energy store with a plurality of battery cells.

8 Claims, 2 Drawing Sheets

METHOD FOR BALANCING STATES OF CHARGE OF AN ELECTRICAL ENERGY STORE

BACKGROUND OF THE INVENTION

The invention is based on a method for balancing states of charge of an electrical energy store with a plurality of battery cells, an electrical energy store, a computer program and an application of the method.

Energy stores using lithium ion technology that consist of a large number of electrochemical battery cells connected electrically in series are employed in today's hybrid and electric vehicles. A battery management system serves for monitoring the energy stores and, in addition to monitoring the safety, should ensure the longest possible service life.

To this end it is necessary to ensure that the states of charge ("SOC") of the battery cells are matched to one another in spite of different self-discharges. This is done through suitable battery cell balancing employing state of charge balancing ("cell balancing"), which as a rule is performed resistively. A resistor and a switching element are provided to each battery cell for this purpose in order to be able to specifically discharge individual battery cells via this ohmic resistance.

In addition to different self-discharge rates of the individual battery cells, the capacities of the battery cells also differ from one another, for example as a result of production variability. At the start of the service life of the battery cells, this effect is negligibly small, but can become greater in the course of the service life of the battery cells as a result of differences in cell ageing, and result in a capacity difference of several percent between the battery cells.

For the purpose of controlling the energy store, a state of charge balancing is carried out while a control device of the battery management system is in the idle phase. For this purpose, an electronic unit for carrying out the state of charge balancing is activated for a pre-specifiable duration $t_{Bal}$. This specification takes place while the control device is switched off. Regulating the programmed duration $t_{Bal}$ or the electric charge to be balanced $\Delta Q$ is not therefore possible.

According to the current prior art, the electric charge to be balanced $\Delta Q$ and the duration $t_{Bal}$ of the state of charge balancing can be determined by means of the following relationship:

determining the charge $Q_i$ of one battery cell i of all the battery cells with respect to the reference state of charge $SOC_{rat}$:

$$Q_i = C_{Bol} * SOH_{C,i} * (SOC_i - SOC_{rat})$$

determining the electric charge to be balanced $\Delta Q_i$ ("balancing requirement") of one battery cell i of all the battery cells:

$$\Delta Q_i = Q_i - Q_{min}$$

determining a duration of the state of charge balancing of one battery cell i of all the battery cells:

$$t_{i,bal} = \frac{\Delta Q_i * R_{Bal}}{U_{Cell}}$$

The reference state of charge $SOC_{rat}$ is the state of charge that all the battery cells adopt when the state of charge is balanced ("balanced state").

The charge $Q_{min}$ is the minimum charge of all the cells with respect to the reference state of charge $SOC_{rat}$.

The electric charge to be balanced $\Delta Q_i$ and the associated duration $t_{bal}$ can only be calculated to a certain degree of accuracy as a result of the inaccuracies in the measurement and calculation.

Document CN103020445 discloses an SOC and SOH prediction method of a lithium iron phosphate battery mounted in an electric vehicle, which has the following steps: improving a Thevenin cell equivalent model; determining the state of charge balancing and the initial balancing of a system; identifying battery model parameters; using a Kalman filter algorithm to iterate the state variables of the system, so that the predicted value of the SOC lies closer to the true value; and using a two-channel Kalman filter algorithm in order to perform online prediction of an internal resistance and a capacity of the lithium iron phosphate battery and, at the same time, to predict the SOH of the battery according to the changes of the internal resistance and the capacity, value of the battery in the current state and in the initial state.

Document CN102231546 discloses a battery management system with balanced charge and discharge functions and a control method for the purpose, that is related to a battery management system of a dynamic battery pack. The battery management system is structurally characterized in that a control unit of the central unit is connected to a battery set and relay set in order to acquire the operating state of the battery and of the relay set. The control unit and a module for balanced discharge are connected one after the other with the battery set and relay set in order to control the balanced discharge of the battery and the relay set, wherein the control unit, a module for balanced charge, and the battery and the relay set are connected one after another in order to control the balanced charging of the battery and the relay set, wherein a supercapacitor is connected to the balanced discharge module in order to store the discharge energy of the battery and of the relay set for the supply of energy for the battery management system.

SUMMARY OF THE INVENTION

The method according to the invention with the characterizing features of the independent claims has, in contrast, the advantage that a calculation accuracy of an electric charge that is to be balanced is determined and taken into consideration in a calculation of a duration for balancing the state of charge. The accuracy and effectiveness of the state of charge balancing is thereby improved, and as a result the capacity and performance capability of an electrical energy store is increased. The method for balancing states of charge of an electrical energy store with a plurality of battery cells comprises for this purpose the following steps:

a) acquiring a voltage magnitude $U_{mess,i}$, that represents an electric voltage of a battery cell i of the plurality of battery cells;

b) determining a maximum positive electric charge $Q_{i,Pos}$ of the battery cell i with respect to an electric reference voltage level $U_{BalLevel}$ of all the battery cells of the electrical energy store with balanced states of charge according to $$Q_{i,Pos} = OCV_{PosErr}(U_{mess,i} + U_{PosErr}) - OCV_{PosErr}(U_{BalLevel}),$$

wherein $OCV_{PosErr}$ represents a no-load voltage curve with a positive capacity estimation error, and $U_{PosErr}$ represents a sensor tolerance of the acquired voltage magnitude $U_{mess,i}$ and a modeled positive battery cell voltage error;

c) determining a maximum negative electric charge $Q_{i,Neg}$ of the battery cell i of the plurality of battery cells with respect to an electric reference voltage level $U_{BalLevel}$ of all the battery cells of the electrical energy store with balanced states of charge according to $$Q_{i,Neg}=OCV_{NegErr}(U_{mess,i}-U_{NegErr})-OCV_{NegErr}(U_{BalLevel}).$$

wherein $OCV_{NegErr}$ represents a no-load voltage curve with a negative capacity estimation error, and $U_{NegErr}$ represents a sensor tolerance of the acquired voltage magnitude $U_{mess,i}$ and a modeled negative battery cell voltage error;

d) determining an electric charge $\Delta Q_i$ to be balanced of the battery cell i of the plurality of battery cells according to $$\Delta Q_i = Q_i - Q_{min},$$

wherein $Q_i$ represents an electric charge of the battery cell i with respect to the reference voltage level $U_{BalLevel}$ and $Q_{min}$ represents a minimum electric charge of all the battery cells located in a series circuit with respect to the reference voltage level $U_{BalLevel}$;

e) determining a charge error $\Delta Q_{i,Err}$ of the electric charge $\Delta Q_i$ to be balanced according to $$\Delta Q_{i,Err} = Q_{i,Pos} - Q_{min,Neg},$$

wherein $Q_{min,Neg}$ represents an electric charge $Q_{i,Neg}$ of the battery cell with the minimum electric charge $Q_{min}$;

f) determining an electric charge $\Delta Q_{i,use}$ to be balanced of the battery cell according to $$\Delta Q_{i,use} = \Delta Q_i - W \cdot \Delta Q_{i,err}.$$

wherein W represents a predefinable weighting factor;

g) calculating a duration $t_{i,bal}$ for balancing the state of charge of the battery cell on the basis of the electric charge $\Delta Q_{i,use}$ that is to be balanced when the electric charge $\Delta Q_{i,use}$ to be balanced exceeds a predefined threshold value, according to $$t_{i,bal} = \frac{\Delta Q_{i,use} \cdot R_{Bal}}{U_{mess,i}},$$

wherein $R_{Bal}$ represents an ohmic resistance assigned to the battery cell;

h) balancing the state of charge of the battery cell for the duration $t_{i,bal}$.

The method according to the invention is not restricted to the sequence of the form of embodiment illustrated. Rather, steps a to h can take place repeatedly, one after another and/or simultaneously.

An electrical energy store in the sense of the present invention refers to an energy store with a plurality of battery cells from which either electrical energy can be withdrawn or to which it can be supplied and withdrawn. The electrical energy store is designed as a charge store and/or a magnetic energy store and/or an electrochemical energy store. The electrochemical energy store is, in particular, a rechargeable battery or accumulator.

If the weighting factor W adopts the value 1, the full charge error $\Delta Q_{i,err}$ is subtracted from the electric charge $\Delta Q_i$ that is to be balanced, and if the weighting factor W adopts the value 0, the charge error $\Delta Q_{i,err}$ is not taken into consideration.

The no-load voltage curve, the sensor tolerance and/or the capacity estimation errors are determined statically and/or dynamically in order to determine the maximum positive charge $Q_{i,Pos}$ and/or the maximum negative charge $Q_{i,Neg}$.

In the case of a static determination, the positive charge $Q_{i,Pos}$ and the maximum negative charge $Q_{i,Neg}$ are determined using a fixed no-load voltage curve, sensor tolerance and/or capacity error as input error values, for example being stored by means of a table in a memory of a control device.

In the case of a dynamic determination, the positive charge $Q_{i,Pos}$ and maximum negative charge $Q_{i,Neg}$ with a dynamic no-load voltage curve, sensor tolerance and/or capacity error are determined as input error values; for example, accuracies of input magnitudes such as $U_{PosErr}$, $U_{NegErr}$ and $SOH_C$ are determined dynamically, and the positive charge $Q_{i,Pos}$ and maximum negative charge $Q_{i,Neg}$ are determined afresh for each application case.

The electric reference voltage level $U_{BatLevel}$ of the battery cells of the electrical energy store with balanced states of charge of all the battery cells is $U_{BalLevel}=3.7V$. This corresponds to a state of charge of 50% of all the battery cells of a 48 V energy store.

The capacity estimation error of the no-load voltage curve OCV is a maximum of ±4%. An uncertainty in the charge determination can in this way reliably be taken into consideration.

Advantageously, an electrical energy store comprises a plurality of battery cells, at least one voltage sensor and at least one means, in particular an electronic battery control device, that are configured to carry out the steps of the method according to the invention.

The electrical energy store comprises discharge resistors for the selective discharge of individual battery cells. In combination with a switching element, individual battery cells can be specifically discharged via this ohmic resistance.

A computer program is advantageously provided, comprising commands whose effect is that the electrical energy store according to the invention can carry out the method steps of the method according to the invention.

A machine-readable storage medium on which the computer program is stored is advantageously provided.

The method according to the invention can advantageously be used in an electrical energy store for electric vehicles, hybrid vehicles, plug-in hybrid vehicles, aircraft, pedelecs or e-bikes, for portable devices for telecommunications or data-processing, for electric hand tools or kitchen appliances, as well as in stationary stores for storing electrical energy, in particular such as has been obtained regeneratively.

BRIEF DESCRIPTION OF THE DRAWINGS

Exemplary embodiments of the invention are illustrated in the drawing, and explained in more detail in the following description.

Here.

The same reference suns identify the same apparatus components in all the figures.

DETAILED DESCRIPTION

Figure 1:
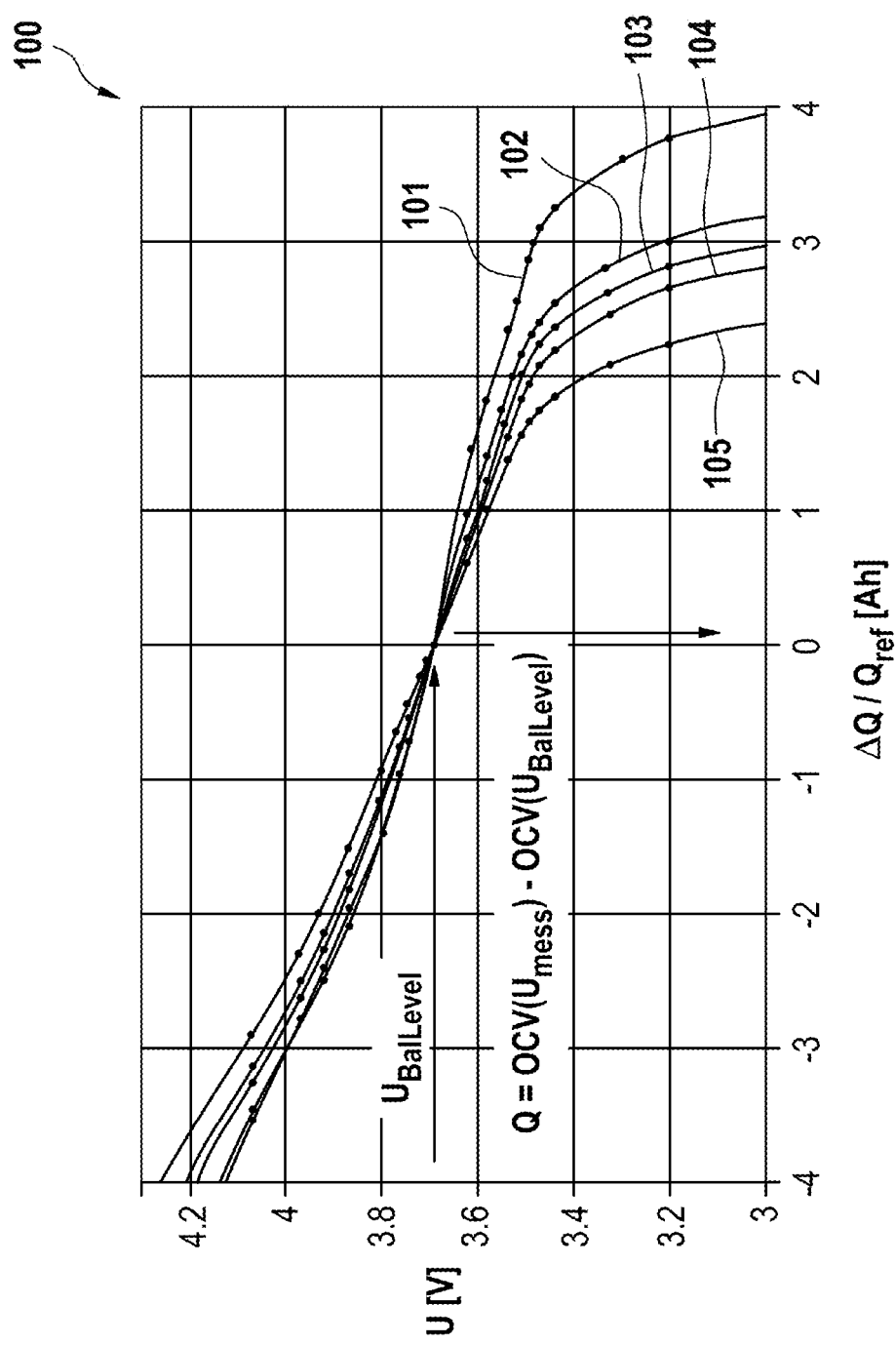
FIG. 1 shows a schematic illustration of no-load voltage curves of an electrical energy store.

FIG. 1 shows a schematic illustration of no-load voltage curves 100 ("OCV") of an electrical energy store at different ageing states $SOH_C$ (beginning of the lifetime ("BOL") end of the lifetime ("EOL")).

| Reference sign | Ageing state [%] |
| --- | --- |
| 101 | 95 |
| 102 | 90 |
| 103 | 85 |
| 104 | 80 |
| 105 | 75 |

These curves can, for example, be ascertained through ageing trials in the laboratory depending on the battery cell type and chemistry. All the no-load voltage curves intersect at a 50% state of charge, which corresponds to approximately 3.7 V in this cell type. This state of charge corresponds to a 48 V energy store or energy storage system, with a balanced state of charge of all the battery cells.

In a battery management system, the respective no-load voltage curve is used for the determination of the charge to be balanced, which corresponds largely to the estimated capacity (OCV(SOH$_C$)). The cell capacity can be ascertained using methods that correspond to the prior art. If the measured cell capacity lies between two no-load voltage curves, then the corresponding no-load voltage curve is interpolated.

If the currently estimated or maximum capacity estimation error is known, for example ±4%, then the enclosing no-load voltage curves can be determined with the maximum capacity estimation error. The real no-load voltage curve of the battery cell lies inside these enclosing no-load voltage curves.

The accuracy of the calculation of the charge to be balanced depends on the accuracy of the modeled no-load voltage, on the measurement accuracy of the battery cell voltage measurement, and on the accuracy of the modeled battery cell voltage. If a battery cell is fully relaxed, the error in the modeled battery cell voltage is equal to 0, otherwise this error is overlaid additively by the accuracy of measurement of the cell voltage measurement.

If all the battery cells are to adopt a state of charge of 3.7 V in a balanced charge state and if, for example, a cell voltage of 3.7 V is measured, then the capacity estimation error has no influence.

As the measured cell voltage deviates increasingly from the reference voltage ($U_{BalLevel}$=3.7V), the influence of the capacity estimation error grows. The voltage measurement error of the sensor and the error in the modeled battery cell voltage are combined additively with the no-load voltage error.

The accuracy of the state of charge balancing between the battery cells is increased through the method according to the invention. The charges of the battery cells that are connected electrically in series are balanced better, and the capacity and performance capability of the energy storage are thereby increased.

In a 48 V energy store, the battery cells are balanced at a target state of charge of 50%. This means that battery cells pass through the state of charge of 50% together. By increasing the accuracy of the state of charge balancing, the minimum and maximum voltage limits are reached later, which leads to an increase in the performance of the electrical energy store.

The number of unnecessary state of charge balancing processes ("pseudo-balancing") is also minimized, which leads to an increase in the lifetime of the energy store and of the discharge resistors.

Figure 2:
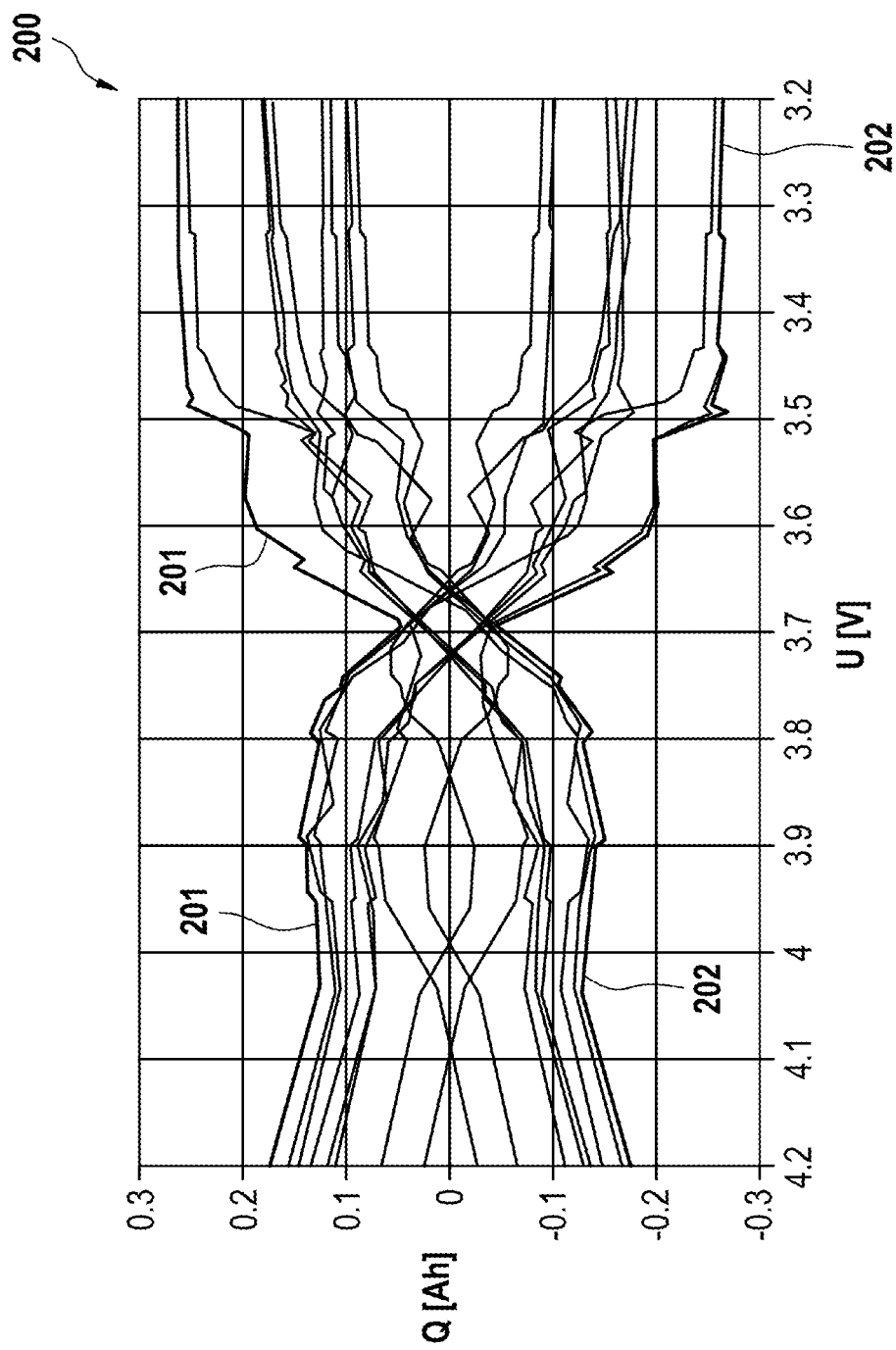
FIG. 2 shows a schematic illustration of a calculation uncertainty of a charge determination for an electric charge that is to be balanced.

FIG. 2 shows a schematic illustration of a calculation uncertainty of a charge determination for an electric charge that is to be balanced. A curve 201 shows the $Q_{Pos}$ and a curve 202 shows the $Q_{Neg}$ less the correct charge Q that is to be balanced of a battery cell. A capacity estimation error of 3.5%, together with a voltage measurement accuracy of the voltage sensor of 3 mV, are assumed for this calculation.

The invention claimed is:

1. A method for balancing states of charge of an electrical energy store with a plurality of battery cells, the method comprising:
   a) acquiring a voltage magnitude $U_{mess,i}$ that represents an electric voltage of a battery cell;
   b) determining a maximum positive electric charge $Q_{i,Pos}$ of the battery cell with respect to an electric reference voltage level $U_{BalLevel}$ of all the battery cells of the electrical energy store with balanced states of charge according to $$Q_{i,Pos}=OCV_{PosErr}(U_{mess,i}+U_{PosErr})-OCV_{PosErr}(U_{BalLevel}),$$

wherein $OCV_{PosErr}$ represents a no-load voltage curve with a positive capacity estimation error and $U_{PosErr}$ represents a sensor tolerance of the acquired voltage magnitude $U_{mess,i}$ and a modeled positive battery cell voltage error;
   c) determining a maximum negative electric charge $Q_{i,Neg}$ of the battery cell with respect to the electric reference voltage level $U_{BalLevel}$ of all the battery cells of the electrical energy store with balanced states of charge according to $$Q_{i,Neg}=OCV_{NegErr}(U_{mess,i}-U_{NegErr})-OCV_{NegErr}(U_{BalLevel}),$$

wherein $OCV_{NegErr}$ represents a no-load voltage curve with a negative capacity estimation error and $U_{NegErr}$ represents a sensor tolerance of the acquired voltage magnitude $U_{mess,i}$ and a modeled negative battery cell voltage error;
   d) determining an electric charge $\Delta Q_i$ to be balanced of the battery cell according to $$\Delta Q_i=Q_i-Q_{min},$$

wherein $Q_i$ represents an electric charge of the battery cell with respect to the reference voltage level $U_{BalLevel}$ and $Q_{min}$ represents a minimum electric charge of all the battery cells located in a series circuit with respect to the reference voltage level $U_{BalLevel}$;
   e) determining a charge error $\Delta Q_{i,Err}$ of the electric charge $\Delta Q_i$ to be balanced according to $$\Delta Q_{i,Err}=Q_{i,Pos}-Q_{min,Neg},$$

wherein $Q_{min,Neg}$ represents an electric charge $Q_{i,Neg}$ of the battery cell with the minimum electric charge $Q_{min}$;
   f) determining an electric charge $\Delta Q_{i,use}$ to be balanced of the battery cell according to $$\Delta Q_{i,use}=\Delta Q_i-W*\Delta Q_{i,err},$$

wherein W represents a predefinable weighting factor;
   g) calculating a duration $t_{i,bal}$ for balancing the state of charge of the battery cell on the basis of the electric charge $\Delta Q_{i,use}$ that is to be balanced when the electric charge $\Delta Q_{i,use}$ to be balanced exceeds a predefined threshold value, according to $$t_{i,bal}=\frac{\Delta Q_i*R_{Bal}}{U_{mess,i}},$$

wherein $R_{Bal}$ represents an ohmic resistance assigned to the battery cell;

h) balancing the state of charge of the battery cell for the duration $t_{i,bal}$.

2. The method according to claim 1, wherein the full charge error $\Delta Q_{i,err}$ is subtracted from the electric charge $\Delta Q_i$ that is to be balanced if the weighting factor W adopts the value 1, and the charge error $\Delta Q_{i,err}$ is not taken into consideration if the weighting factor W adopts the value 0.

3. The method according to claim 1, wherein the no-load voltage curve, the sensor tolerance, and/or the capacity estimation errors are determined statically and/or dynamically in order to determine the maximum positive charge $Q_{i,Pos}$ and/or the maximum negative charge $Q_{i,Neg}$.

4. The method according to claim 1, wherein the electric reference voltage level $U_{BalLevel}$ of the battery cells of the electrical energy store with balanced states of charge of all the battery cells is 3.7 V.

5. The method according to claim 1, wherein the capacity estimation error of the no-load voltage curve OCV is a maximum of ±4%.

6. An electrical energy store comprising:
   a plurality of battery cells;
   at least one voltage sensor; and
   at least one electronic battery control device, the at least one electronic battery control device configured to carry out the steps of the method according to claim 1.

7. The electrical energy store according to claim 6, further comprising:
   discharge resistors for the selective discharge of individual battery cells.

8. A non-transitory, machine-readable storage medium containing instructions that, when executed by a computer, cause the computer to
   a) acquire a voltage magnitude $U_{mess,i}$ that represents an electric voltage of a battery cell;
   b) determine a maximum positive electric charge $Q_{i,pos}$ of the battery cell with respect to an electric reference voltage level $U_{BalLevel}$ of all the battery cells of the electrical energy store with balanced states of charge according to $Q_{i,Pos} = OCV_{PosErr}(U_{mess,i} + U_{PosErr}) - OCV_{PosErr}(U_{BalLevel})$, wherein $OCV_{PosErr}$ represents a no-load voltage curve with a positive capacity estimation error and $U_{PosErr}$ represents a sensor tolerance of the acquired voltage magnitude $U_{mess,i}$ and a modeled positive battery cell voltage error;

c) determine a maximum negative electric charge $Q_{i,Neg}$ of the battery cell with respect to the electric reference voltage level $U_{BalLevel}$ of all the battery cells of the electrical energy store with balanced states of charge according to $Q_{i,Neg} = OCV_{NegErr}(U_{mess,i} - U_{NegErr}) - OCV_{NegErr}(U_{BalLevel})$, wherein $OCV_{NegErr}$ represents a no-load voltage curve with a negative capacity estimation error and $U_{NegErr}$ represents a sensor tolerance of the acquired voltage magnitude $U_{mess,i}$ and a modeled negative battery cell voltage error;

d) determine an electric charge $\Delta Q_i$ to be balanced of the battery cell according to $\Delta Q_i = Q_i - Q_{min}$, wherein $Q_i$ represents an electric charge of the battery cell with respect to the reference voltage level $U_{BalLevel}$ and $Q_{min}$ represents a minimum electric charge of all the battery cells located in a series circuit with respect to the reference voltage level $U_{BalLevel}$;

e) determine a charge error $\Delta Q_{i,Err}$ of the electric charge $\Delta Q_i$ to be balanced according to $\Delta Q_{i,Err} = Q_{i,Pos} - Q_{min,Neg}$, wherein $Q_{min,Neg}$ represents an electric charge $Q_{i,Neg}$ of the battery cell with the minimum electric charge $Q_{min}$;

f) determine an electric charge $\Delta Q_{i,use}$ to be balanced of the battery cell according to $\Delta Q_{i,use} = \Delta Q_i - W * \Delta Q_{i,err}$, wherein W represents a predefinable weighting factor;

g) calculate a duration $t_{i,bal}$ for balancing the state of charge of the battery cell on the basis of the electric charge $\Delta Q_{i,use}$ that is to be balanced when the electric charge $\Delta Q_{i,use}$ to be balanced exceeds a predefined threshold value, according to $$t_{i,bal} = \frac{\Delta Q_i * R_{Bal}}{U_{mess,i}},$$

wherein $R_{Bal}$ represents an ohmic resistance assigned to the battery cell; and balancing the state of charge of the battery cell for the duration $t_{i,bal}$.

* * * * *